US005806994A

United States Patent [19]

Coffy et al.

[11] Patent Number: 5,806,994

[45] Date of Patent: Sep. 15, 1998

[54] MAILING MACHINE HAVING INK JET PRINTING AND MAINTENANCE SYSTEM

[75] Inventors: Jean-Hiram Coffy, Norwalk; Jerome E. Jackson, Newtown; Richard A. Malin, Westport; Edilberto I. Salazar, Brookfield, all of Conn.

[73] Assignee: Pitney Bowes Inc., Stamford, Conn.

[21] Appl. No.: 951,074

[22] Filed: Oct. 15, 1997

[51] Int. Cl.[6] .......... G01D 15/18

[52] U.S. Cl. .......... 400/120.01; 347/4; 347/12; 347/14; 347/23; 347/29; 347/33; 347/35

[58] Field of Search .......... 400/120.01; 347/4, 347/9, 12, 13, 14, 22, 23, 29, 33, 35

[56] References Cited

U.S. PATENT DOCUMENTS

| | | | |
|---|---|---|---|
| 3,925,789 | 12/1975 | Kashio | 347/23 |
| 4,001,839 | 1/1977 | Kraus | 347/23 |
| 4,128,345 | 12/1978 | Brady | 400/120.01 |
| 4,176,363 | 11/1979 | Kasahara | 347/23 |
| 4,558,332 | 12/1985 | Takahashi | 347/23 |
| 4,970,527 | 11/1990 | Gatten | 347/23 |
| 5,404,229 | 4/1995 | Uno et al. | 347/23 |
| 5,475,404 | 12/1995 | Takahashi et al. | 347/23 |
| 5,565,898 | 10/1996 | Sakuma | 347/23 |
| 5,583,547 | 12/1996 | Gast et al. | 347/22 |
| 5,592,034 | 1/1997 | Felmus et al. | 347/23 |
| 5,659,342 | 8/1997 | Lund et al. | 347/35 |
| 5,701,145 | 12/1997 | Ninomiya | 347/23 |

*Primary Examiner*—Eugene H. Eickholt
*Attorney, Agent, or Firm*—Angelo N. Chaclas; Melvin J. Scolnick

[57] ABSTRACT

A mailing machine comprising a printer module, a transport device and a controller in operative communication with the transport device and the printer module. The printer module including an array of ink jet print elements for printing on an envelope and a repositioning device in operative engagement with the array of ink jet print elements for moving the array of ink jet print elements between a maintenance position and a print position. The transport device including suitable structure for feeding the envelope in a path of travel so that the envelope passes in opposed relationship to the array of ink jet print elements when the array of ink jet print elements are in the print position. The controller keeps an indicator of an amount of time elapsed between printing successive envelopes. If the indicator reaches a predetermined threshold, then the controller causes the array of ink jet print elements to perform a maintenance operation by firing the array of ink jet print elements in the absence of the envelope while the printer module is in the print position.

18 Claims, 7 Drawing Sheets

MAILING MACHINE HAVING INK JET PRINTING AND MAINTENANCE SYSTEM

FIELD OF THE INVENTION

This invention relates to ink jet printing in a mailing machine. More particularly, this invention is directed to a mailing machine having ink jet printing and a maintenance system for improved print quality and throughput.

BACKGROUND OF THE INVENTION

Ink jet printers are well known in the art. Generally, an ink jet printer includes an array of nozzles or orifices, a supply of ink, a plurality of ejection elements (typically either expanding vapor bubble elements or piezoelectric transducer elements) corresponding to the array of nozzles and suitable driver and control electronics for controlling the ejection elements. Typically, the array of nozzles and the ejection elements along with their associated components are referred to as a print head. It is the activation of the ejection elements that causes drops of ink to be expelled from the nozzles. The ink ejected in this manner forms drops which travel along a flight path until they reach a print medium such as a sheet of paper, overhead transparency, envelope or the like. Once they reach the print medium, the drops dry and collectively form a print image. Typically, the ejection elements are selectively activated or energized as relative movement is provided between the print head and the print medium so that a predetermined or desired print image is achieved.

Generally, the array of nozzles, supply of ink, plurality of ejection elements and driver electronics are packaged into an ink jet cartridge. In turn, the printer includes a carriage assembly for detachably mounting the ink jet cartridge thereto. In this manner, a fresh ink jet cartridge may be installed when the ink supply of the current ink cartridge has been consumed. Additionally, the printer typically includes a maintenance module for capping, wiping and generally keeping the ink jet cartridge in proper working order.

Recently, the postage meter/mailing machine industry and other envelope printing industries have begun to incorporate ink jet printers having user replaceable ink jet cartridges. A typical postage meter (one example of a postage printing apparatus) applies evidence of postage, commonly referred to as a postal indicia, to an envelope or other mailpiece and accounts for the value of the postage dispensed. As is well known, postage meters include an ascending register that stores a running total of all postage dispensed by the meter and a descending register that holds the remaining amount of postage credited to the meter. The descending register is reduced by an amount of postage dispensed during each transaction.

Generally, the postage meter may be incorporated into a mailing machine, which is also well known in the art, for automated handling of the mailpieces. Mailing machines are readily available from manufacturers such as Pitney Bowes Inc. of Stamford, Conn., USA and often include a variety of different modules, which automate the processes of producing mailpieces. The typical mailing machine includes a variety of different modules or sub-systems where each module performs a different task on a mailpiece, such as: singulating (separating the mailpieces one at a time from a stack of mailpieces), weighing, sealing (wetting and closing the glued flap of an envelope), applying evidence of postage, accounting for postage used (performed by the postage meter), feeding roll tape or cut tape strips for printing and stacking finished mailpieces. However, the exact configuration of each mailing machine is particular to the needs of the user. Customarily, the mailing machine also includes a transport apparatus, which feeds the mailpieces in a path of travel through the successive modules of the mailing machine.

Two measures that customers use to evaluate mailing machines are throughput and print quality. Both of these are important to the overall operational efficiency of the mailing machine. Throughput is generally defined by the number of envelopes that the mailing machine can process over a given period of time (as examples: # of envelopes per minute or # of envelopes per hour). A higher rate of throughput lowers the processing cost per envelope by amortizing the cost of the mailing machine over a greater number of envelopes.

A quality printed image of the postal indicia is important to ensure that the postal authority promptly delivers the envelope and that the customer does not incur any loss of postal funds. To protect the stream of postal revenues, the postal authority is constantly on guard against fraud postal indicias. As a result, the postal authority inspects an incoming envelope to determine whether or not the postal indicia is an authentic representation that the postal value indicated has been properly accounted for. To perform this inspection, the postal authority requires a quality printed postal indicia so that the information contained within the postal indicia may be easily read and used to verify the integrity of the postal indicia. On the other hand, if the postal indicia is poorly printed and the authenticity of the postal indicia cannot be determined, then the envelope is likely to be returned to the sender. The return of an envelope causes and interruption of business communications which may have severe negative consequences. Additionally, this results in the customer losing the postal funds associated with the returned envelope.

Therefore, there is a need for a mailing machine including an ink jet printer and a maintenance system that keeps the ink jet printer in proper working order so as to produce a quality printed postal indicia without adversely impacting the throughput of the mailing machine.

SUMMARY OF THE INVENTION

In accordance with the present invention, there is provided a mailing machine comprising a printer module, a transport device and a controller in operative communication with the transport device and the printer module. The printer module includes an array of ink jet print elements for printing on an envelope and a repositioning device in operative engagement with the array of ink jet print elements for moving the array of ink jet print elements between a maintenance position and a print position. The transport device includes suitable structure for feeding the envelope in a path of travel so that the envelope passes in opposed relationship to the array of ink jet print elements when the array of ink jet print elements are in the print position. The controller keeps an indicator of an amount of time elapsed between- printing successive envelopes. If the indicator reaches a predetermined threshold, then the controller causes the array of ink jet print elements to perform a maintenance operation by firing the array of ink jet print elements in the absence of the envelope while the printer module is in the print position.

In accordance with the present invention, there is also a corresponding method of operating the mailing machine summarized above and described in detail below.

Therefore, it should now be apparent that the present invention substantially overcomes the disadvantages associated with the prior art. Additional advantages of the invention will be set forth in the description, which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

Figure 1:
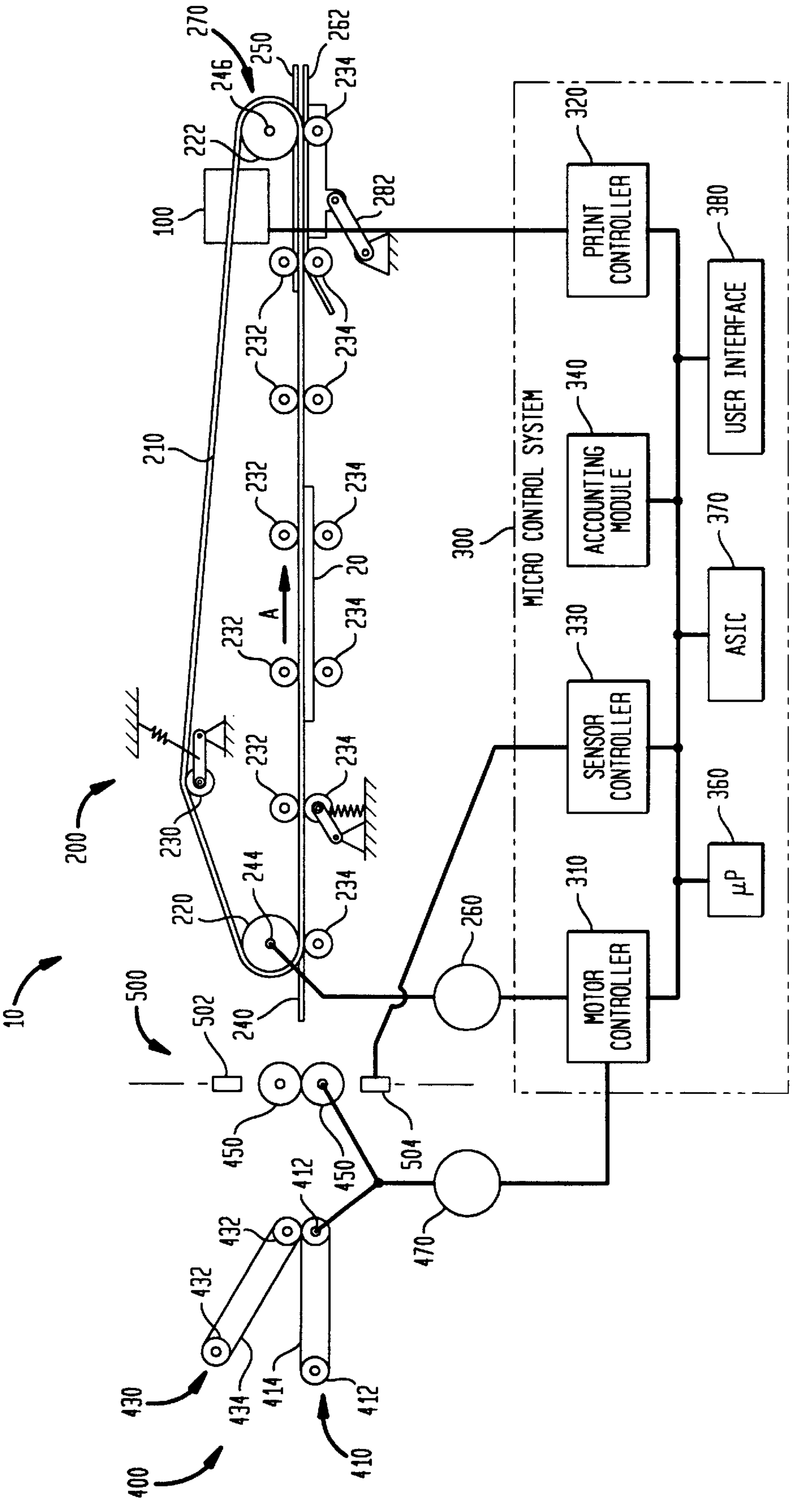
FIG. 1 is a simplified schematic of a front elevational view of a mailing machine in which the present invention may be incorporated.

Referring to FIG. 1, an example of a mailing machine 10 in which the present invention may be incorporated is shown. The mailing machine 10 includes a printer module 100, a conveyor apparatus 200, a micro control system 300, a singulator module 400 and a user interface 380 for providing communication between an operator and the mailing machine 10. Other modules of the mailing machine 10, such as those described above, have not been shown for the sake of clarity. The singulator module 400 receives a stack of envelopes (not shown), or other mailpieces such as postcards, folders and the like, and separates and feeds them in a seriatim fashion (one at a time) in a path of travel as indicated by arrow A. The conveyor apparatus 200 feeds the envelopes 20 in the path of travel along a deck 240 past the printer module 100 so that a postal indicia can be printed on each envelope 20. Together, the singulator module 400 and the conveyor module 200 make up a transport apparatus for feeding the envelopes 20 through the various modules of the mailing machine 10. The mailing machine 10 also includes suitable structure (not shown) for feeding tape T (not shown) through the mailing machine 10 along a feed path substantially parallel to the path of travel of the envelope 20.

The singulator module 400 includes a feeder assembly 410 and a retard assembly 430 which work cooperatively to separate a batch of envelopes (not shown) and feed them one at a time to a pair of take-away rollers 450. The feeder assembly 410 includes a pair of pulleys 412 having an endless belt 414 extending therebetween. The feeder assembly 410 is operatively connected to a motor 470 by any suitable drive train which causes the endless belt 414 to rotate clockwise so as to feed the envelopes in the direction indicated by arrow A. The retard assembly 430 includes a pair of pulleys 432 having an endless belt 434 extending therebetween. The retard assembly 430 is operatively connected to any suitable drive means (not shown) which causes the endless belt 434 to rotate clockwise so as to prevent the upper envelopes in the batch of envelopes from reaching the take-away rollers 450. In this manner, only the bottom envelope in the stack of envelopes advances to the take-away rollers 450. Those skilled in the art will recognize that the retard assembly 430 may be operatively coupled to the same motor 470 as the feeder assembly 410.

Since the details of the singulator module 400 are not necessary for an understanding of the present invention, no further description will be provided. However, an example of a singulator module suitable for use in conjunction with the present invention is described in U.S. Pat. No. 4,978,114, entitled REVERSE BELT SINGULATING APPARATUS, the disclosure of which is specifically incorporated herein by reference.

The take-away rollers 450 are located adjacent to and downstream in the path of travel from the singulator module 400. The take-away rollers 450 are operatively connected to motor 470 by any suitable drive train (not shown). Generally, it is preferable to design the feeder assembly drive train and the take-away roller drive train so that the take-away rollers 450 operate at a higher speed than the feeder assembly 410. Additionally, it is also preferable that the take-away rollers 450 have a very positive nip so that they dominate control over the envelope 20. Consistent with this approach, the nip between the feeder assembly 410 and the retard assembly 430 is suitably designed to allow some degree of slippage.

The mailing machine 10 further includes a sensor module 500, which is substantially in alignment with the nip of take-away rollers 450 for detecting the presence of the envelope 20. Preferably, the sensor module 500 is of any conventional optical type, which includes a light emitter 502 and a light detector 504. Generally, the light emitter 502 and the light detector 504 are located in an opposed relationship on opposite sides of the path of travel so that the envelope 20 passes therebetween. By measuring the amount of light that the light detector 504 receives, the presence or absence of the envelope 20 can be determined. Generally, by detecting the lead and trail edges of the envelope 20, the sensor module 500 provides signals to the micro control system 300 which are used to determine the length of the envelope 20 and measure the gap between successive envelopes 20.

The conveyor apparatus 200 includes an endless belt 210 looped around a drive pulley 220 and an encoder pulley 222 which is located downstream in the path of travel from the drive pulley 220 and proximate to the printer module 100. The drive pulley 220 and the encoder pulley 222 are substantially identical and are fixably mounted to shafts 244 and 246, respectively, which are in turn rotatively mounted to any suitable structure (not shown) such as a frame. The drive pulley 220 is operatively connected to a motor 260 by any conventional means such as intermeshing gears (not shown) or a timing belt (not shown) so that when the motor 260 rotates in response to signals from the micro control system 300, the drive pulley 220 also rotates which in turn causes the endless belt 210 to rotate and advance the envelope 20 along the path of travel.

The conveyor apparatus 200 further includes a plurality of idler pulleys 232, a plurality of normal force rollers 234 and a tensioner pulley 230. The tensioner pulley 230 is initially spring biased and then locked in place by any conventional manner such as a set screw and bracket (not shown). This allows for constant and uniform tension on the endless belt 210. In this manner, the endless belt 210 will not slip on the drive pulley 220 when the motor 260 is energized and caused to rotate. The idler pulleys 232 are rotatively mounted to any suitable structure (not shown) along the path of travel between the drive pulley 220 and the encoder pulley 222. The normal force rollers 234 are located in opposed relationship and biased toward the idler pulleys 232, the drive pulley 220 and the encoder pulley 222, respectively. For clarity, only one of the idler pulleys 232 has been shown with the biasing structure.

As described above, the normal force rollers 234 work to bias the envelope 20 up against the deck 240. This is commonly referred to as top surface registration, which is beneficial for ink jet printing. In the area of the print module 100, a registration shield 250 and a registration ski 262, the details of which are provided below, are utilized to define the print gap between the top surface of the envelope 20 and the array of nozzles (not shown). The conveyor apparatus 200 feeds the envelope 20 so that it passes between the registration shield 250 and the registration ski 262. The registration shield 250 is fixably mounted to any suitable structure such as a frame (not shown). On the other hand, the registration ski 262 is pivotably mounted along its span to one end of a ski arm 282 while the other end of the ski arm 282 is pivotably mounted to any suitable structure such as a frame (not shown). A torsion spring (not shown) biases the registration ski 262 upward toward the registration shield 250. In this manner, any variation in thickness of the envelope 20 is taken up by the deflection of the normal force rollers 234 and the registration ski 262. Thus, a constant print gap is set between the envelope 20 and the printer module 100 no matter what the thickness of the envelope 20. The constant print gap is optimally set to a desired value to achieve quality printing. It is important to note that the deck 240 contains suitable openings (not shown) for the endless belt 210 and normal force rollers 234.

Figure 4:
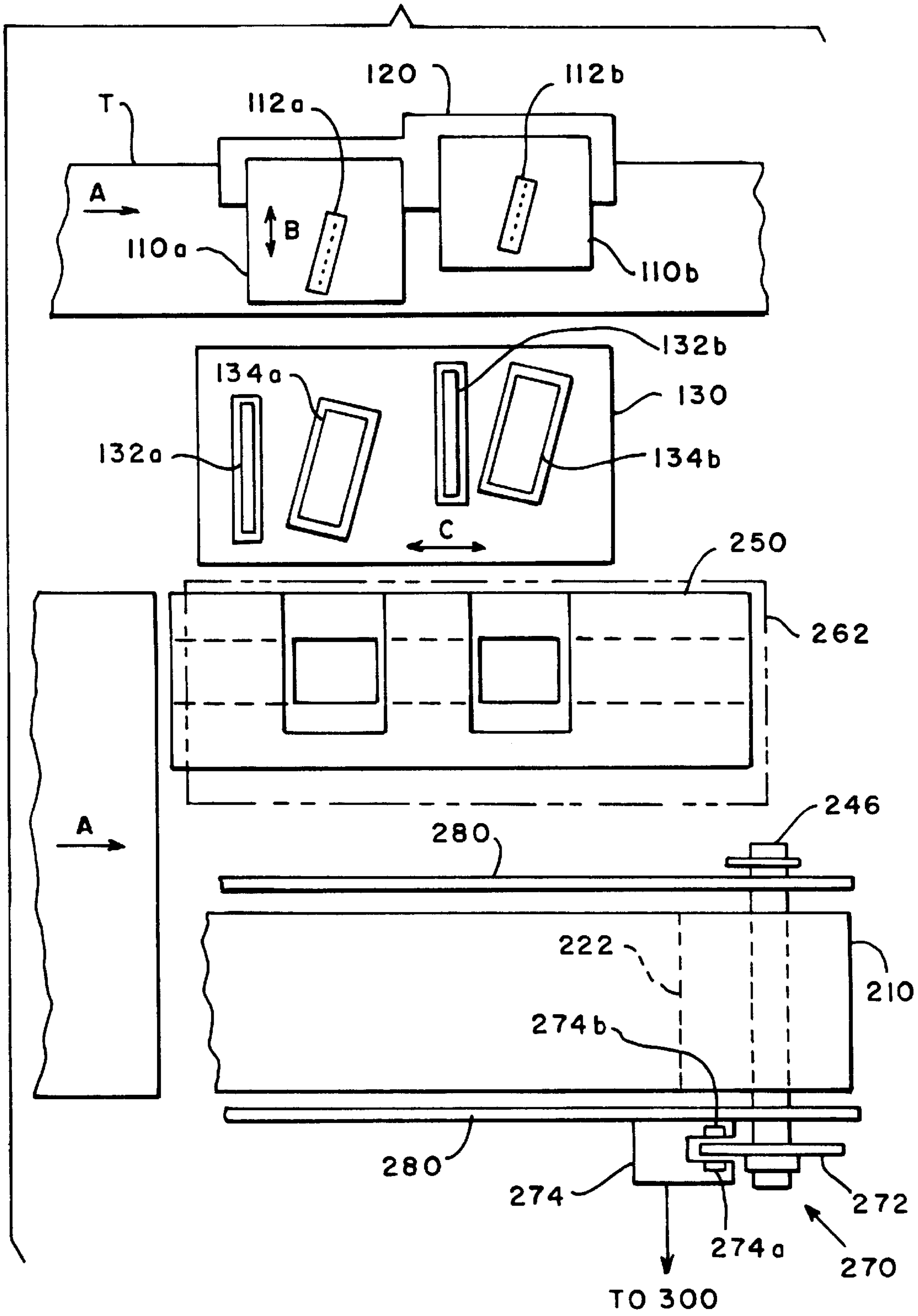
FIG. 4 is a simplified schematic representation of a plan view of a printer module, an encoder pulley, an encoder system and the registration shield (in phantom) in accordance with the invention.

Referring to FIGS. 1 and 4, the conveyor apparatus 200 also includes an encoder system 270, which is located proximate to the printer module 100 and operatively coupled to the encoder pulley 222. The encoder system 270 includes an encoder disk 272 fixably mount to the shaft 246 and an encoder detector 274 fixably mounted to the frame 280. Thus, as the encoder pulley 222 rotates so does the encoder disk 272. The encoder disk 272 has a plurality of vanes located around its circumference and is of a conventional type, such as model number HP 5100 available from Hewlett-Packard Company. The encoder detector 274 is also of conventional type; such as model number HP 9100 available from Hewlett-Packard Company, and includes a light source 274*a* and a light detector 274*b*. The encoder disk 272 and the encoder detector 274 are positioned with respect to each other so that the vanes of the encoder disk 272 alternately block and unblock the light source 274*a* as the shaft 246 rotates. The transition from blocked to unblocked or vice versa results in a change of state or encoder signal (also commonly referred to as a "count") for the encoder detector 274. The encoder disk 272 has been selected so that 1024 counts occur per revolution. In this manner, the position and speed of the shaft 246 can be tracked. This type of encoder system 270 is well known and those skilled in the art will recognize other means for encoding, which would serve equally well.

In the preferred embodiment, the printer module 100 includes a carriage 120, a first ink jet cartridge 110*a* having an array of nozzles 112*a* and a second ink jet cartridge 110*b* having an array of nozzles 112*b*, both of which are separately detachably mounted to the carriage 120 by any conventional means. An outline of the registration ski 262 is shown in phantom (for the sake of clarity) so as to provide an indication of its relationship to the registration shield 250 and the cartridges 110*a* and 110*b*. The details of the registration shield 250 and the registration ski 262 will be described further below.

Generally, the distance between the ink jet cartridge 110*a* and the second ink jet cartridge 110*b* as measured along the path of travel is necessary for packaging considerations. Typically, high performance print heads capable of high resolution printing at high speeds are only available in linear arrays of small length. Thus, to print a wide swath across the envelope 20 requires the alignment of multiple ink jet cartridges in end-to-end fashion as measured in a direction transverse to the path of travel. The use of multiple print heads in this fashion increases the print zone over which accurate encoding needs to take place because encoding must now occur over the print area plus the distance between the ink jet cartridges. Those skilled in the art will recognize that any number of ink jet cartridges can be arranged in this or analogous manners to achieve any desired effective print swath.

Figure 2B:
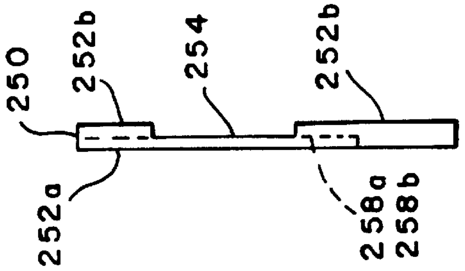
FIG. 2*b* is an end view of the registration shield for use in the mailing machine in accordance with the present invention.
Figure 2A:
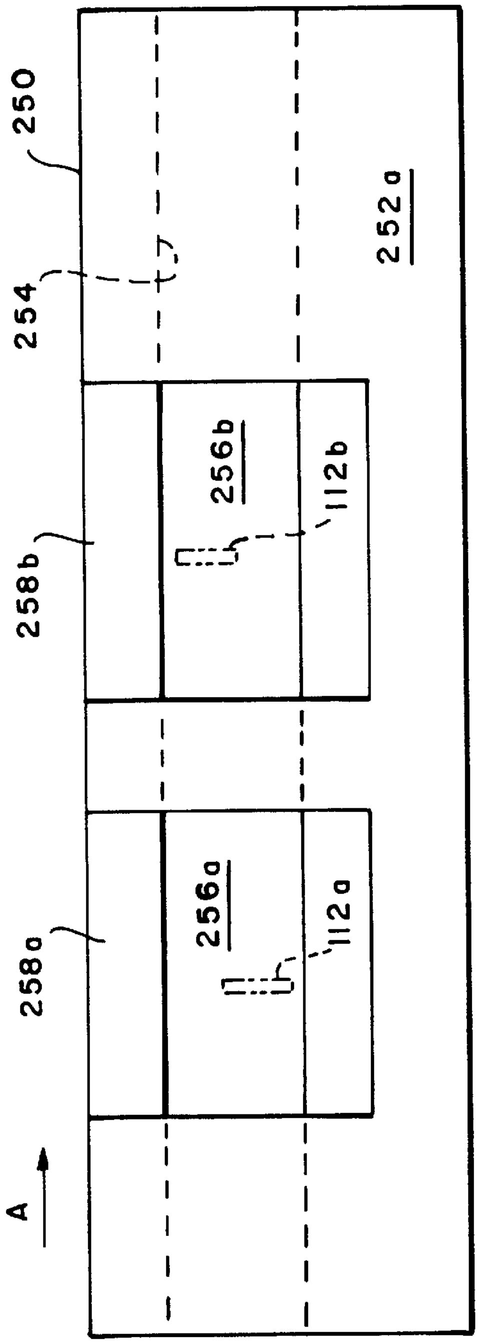
FIG. 2*a* is a plan view of a registration shield for use in the mailing machine in accordance with the present invention.
Figure 2C:
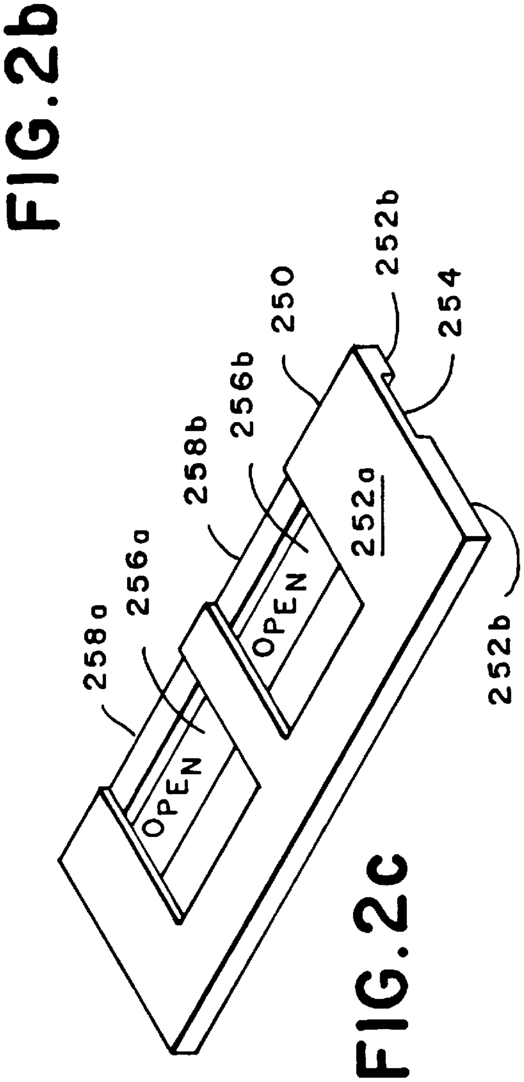
FIG. 2*c* is a perspective view of the registration shield for use in the mailing machine in accordance with the present invention.

Referring to FIGS. 2*a*, 2*b* and 2*c*, the details of the registration shield 250 are shown. So that the relationship of the registration shield 250 to the printer module 100 (not shown) can be better understood, the arrays of nozzles 112*a* and 112*b* are shown in dotted lines. The registration shield 250 is generally rectangular in shape and includes a top surface 252*a* and a bottom surface 252*b*. The bottom surface 252*b* includes a generally U-shaped channel 254 extending parallel to the path of travel from one end of the registration shield 250 to the other end. As described above, the rollers 234 (not shown) operate to bias the top surface of the envelope 20 (not shown) against the bottom surface 252*b* of the registration shield. In this manner, the envelope 20 does not contact the registration shield 250 in the area of the channel 254. Instead, the top surface of the envelope 20 rides along the bottom surface 252*b*.

The registration shield 250 further includes a plurality of openings 256*a* and 256*b* corresponding to the first array of nozzles 112*a* and the second array of nozzles 112*b*, respectively. The openings 256*a* and 256*b* are suitably large and positioned to allow the arrays of nozzles 112*a* and 112*b*, respectively, to fire droplets of ink through them. In the preferred embodiment, the openings 256*a* and 256*b* are located to be coincident (overlapping) with the channel 254.

The top surface 252*a* of the registration shield 250 includes a pair of generally U-shaped relief channels 258*a* and 258*b* corresponding to the first cartridge 110*a* (not shown) and the second cartridge 110*b* (not shown), respectively. The relief channels 258*a* and 258*b* extend transverse to the path of travel beginning along an end of the registration shield 250 nearest to the printer module 100 (not shown) and terminating before reaching the opposite end of the registration shield 250.

Figure 3B:
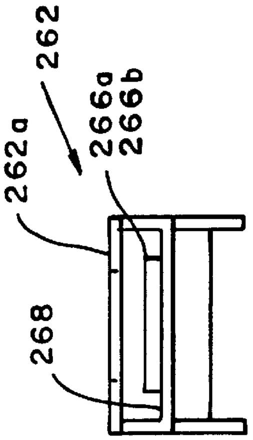
FIG. 3*b* is an end view of the registration ski for use in the mailing machine in accordance with the present invention.
Figure 3C:
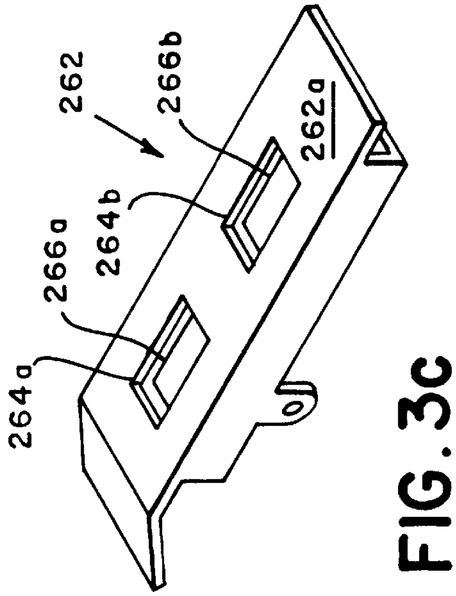
FIG. 3*c* is a perspective view of the registration ski for use in the mailing machine in accordance with the present invention.
Figure 3D:
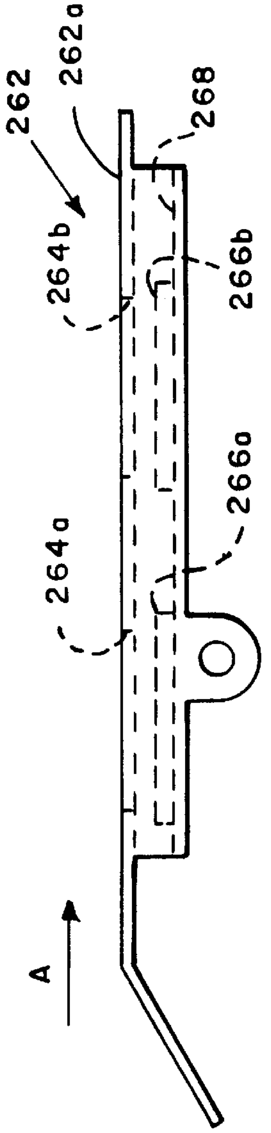
FIG. 3*d* is a front elevational view of the registration ski for use in the mailing machine in accordance with the present invention.
Figure 3A:
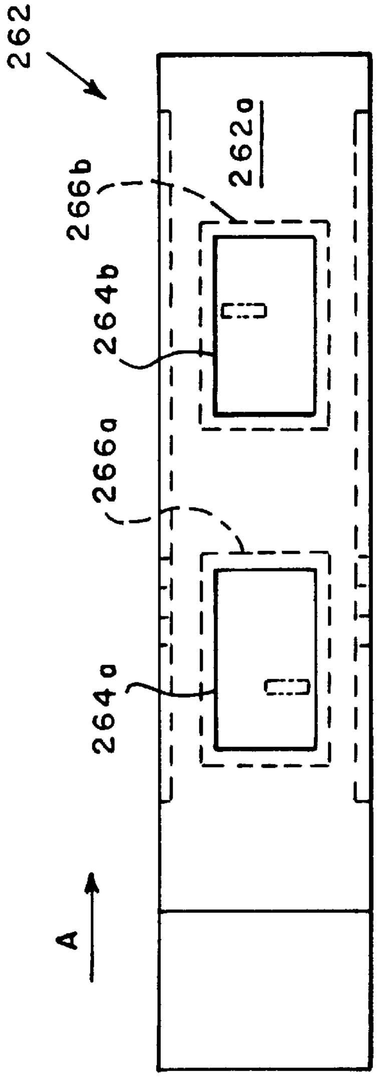
FIG. 3*a* is a plan view of a registration ski for use in the mailing machine in accordance with the present invention.

Referring to FIGS. 3*a,* 3*b,* 3*c* and 3*d,* the details of the registration ski 262 are shown. So that the relationship of the registration ski 262 to the printer module 100 (not shown) can be better understood, the arrays of nozzles 112*a* and 112*b* are shown in dotted lines. The registration ski 262 is generally tubular in shape with a substantially rectangular cross section and includes a top surface 262*a* along which the bottom surface of the envelope 20 (not shown) rides.

The registration ski 262 further includes a plurality of openings 264*a* and 264*b* and a plurality of corresponding foam pads 266*a* and 266*b* mounted directly underneath the plurality of openings 264*a* and 264*b,* respectively, to a lower surface 268 which is below the path of the envelope 20 (not shown). The plurality of openings 264*a* and 264*b* are in substantial alignment with the plurality of openings 256*a* and 256*b* (not shown), respectively, of the registration shield 250 (not shown). In this manner, the foam pads 266*a* and 266*b* absorb the ink that is expelled during the fire in place maintenance operation so as to prevent waste ink from soiling the mailing machine. Additionally, since the foam pads 266*a* and 266*b* are located below the top surface 262*a,* the envelope 20 is prevented from coming into contact with the foam pads 266*a* and 266*b.* Thus, the bottom surface of the envelope 20 remains clean.

Referring to FIGS. 1 and 4, the conveyor apparatus 200, the user interface 380 and the printer module 100 are under the control of the micro control system 300 which may be of any suitable combination of microprocessors, firmware and software. The micro control system 300 includes a motor controller 310 which is in operative communication with the motor 260, a printer controller 320 having a suitable processor and memory which is in operative communication with the printer module 100, a sensor controller 330 which is in operative communication with the sensor module 500, an accounting module 340 (postage meter) for tracking postal funds, a microprocessor 360 and a security application specific integrated circuit (ASIC) 370. Additionally, the micro control system 300 is in operative communication with the encoder system 270 via the encoder detector 274. The micro control system 300 constantly compares the actual position of the envelope 20 with the desired position of the envelope 20 and computes appropriate corrective drive signals, which are communicated to the motor controller 310. The motor controller 310 then provides energizing signals to the motor 260 in response to the drive signals received from the micro control system 300. Those skilled in the art will recognize that the various components of the micro control system 300 are in operative communication with each other over conventional communication lines, such as a communication bus.

Figure 5:
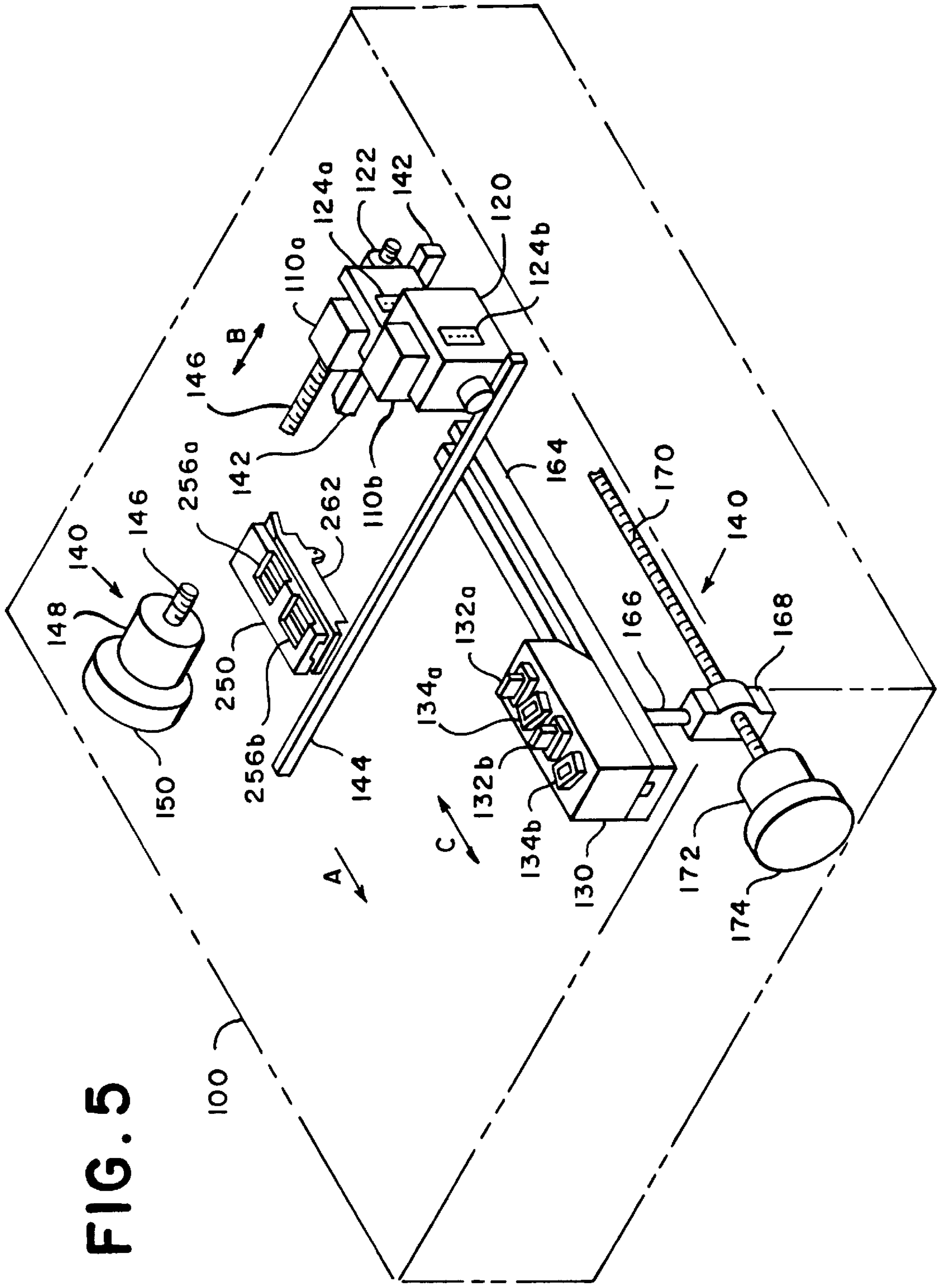
FIG. 5 is a more detailed schematic of a perspective view of the printer module including the registration shield and a pair of print cartridges in accordance with the present invention.

Referring to FIG. 5, a more detailed view of the printer module 100 is shown. It will be appreciated by those skilled in the art that the printer module 100 includes suitable framework for supporting the various components of the printer module 100 which has not been shown for the sake of clarity. The printer module 100 includes the carriage 120, the pair of ink jet cartridges 110*a* and 110*b* each detachably mounted to the carriage 120, a maintenance assembly 130 and an assembly 140 for repositioning the carriage 120 and the maintenance assembly 130 into and out of operative engagement. The ink jet cartridges 110*a* and 110*b* are detachably mounted to connectors 124*a* and 124*b,* respectively, which are in turn fixably mounted to the carriage 120. Print data signals are supplied to the ink jet cartridges 110*a* and 110*b* from the printer controller 320 (not shown) via the connectors 124*a* and 124*b,* respectively.

Referring to FIGS. 4 and 5, the printer module 100 is used for printing a postal indicia on the envelope 20 or the tape T. Both of which travel along substantially parallel paths in the direction indicated by the arrow A. Importantly, the envelope 20 is fed between the registration shield 250 and the registration ski 262. The repositioning assembly 140 includes a pair of rails 142 and 144, respectively, on which the carriage 120 rests. A lead screw 146 is driven by a drive motor 148 and threadingly engages a nut 122 fixably attached to the carriage 120 in order to translate the carriage 120 back and forth along the rails 142 and 144 as indicated by a double-sided arrow B. A conventional encoder system 150 is operatively connected to the drive motor 148 for providing signals indicative of the position of the carriage 120 along the lead screw 146. The carriage 120 can be stopped at various positions along the lead screw 146 depending upon whether the cartridges 110*a* and 110*b* are printing or engaged with the maintenance assembly 130. To print on the envelope 20, the carriage 120 is driven along the rails 142 and 144 until the arrays of nozzles 112*a* and 112*b* are positioned over the openings 256*a* and 256*b,* respectively, of the registration shield 250. To print on the tape T, the carriage 120 is driven in the opposite direction along the rails 142 and 144 until the arrays of nozzles 112*a* and 112*b* are positioned over the tape T. The maintenance position is located between the envelope print position and the tape print position.

The repositioning assembly 140 further includes suitable structure for repositioning the maintenance assembly 130. The maintenance assembly 130 travels along a track 164 as indicated by a double-sided arrow C. A pin 166 engages an aperture (not shown) in the maintenance assembly 130 to reposition the maintenance assembly 130 along the track 164. The pin 166 is seated in a block 168, which threadingly engages a lead screw 170, which in turn is driven by a drive motor 172. Additionally, a conventional encoder system 174 is operatively connected to the drive motor 172 for providing signals indicative of the position of the maintenance assembly 130 along the lead screw 170. The maintenance assembly 130 can be stopped at various positions along the lead screw 170 depending upon whether the cartridges 110*a* and 110*b* are printing or engaged with the maintenance assembly 130.

The maintenance assembly 130 operates to wipe and cap the cartridges 110*a* and 110*b* in conventional fashion and includes a pair of wiper blades 132*a* and 132*b* and an associated pair of caps 134*a* and 134*b.* Each corresponding to the arrays of nozzles 112*a* and 112*b,* respectively. When the carriage 120 is in the maintenance position, the maintenance assembly 130 can be actuated so that wiper blade 132*a* swabs the array of nozzles 112*a* so as to remove any excess ink from the face plate of the array of nozzles 112*a.* Also, the maintenance assembly 130 can be brought directly underneath the carriage 120 so that the cap 134*a* can be raised into engagement with the array of nozzles 112*a* so as to seal the array of nozzles 112*a* off from ambient air. It should be noted that the maintenance assembly 130 contains conventional structure, such as a solenoid attached to a linkage (not shown) or a suitable cam operatively coupled to a motor (not shown), for raising and lowering the wiper blade 132*a* and the cap 134*a* as necessary. The wiper blade 132*b* and the cap 134*b* operate in analogous fashion.

Figure 6A:
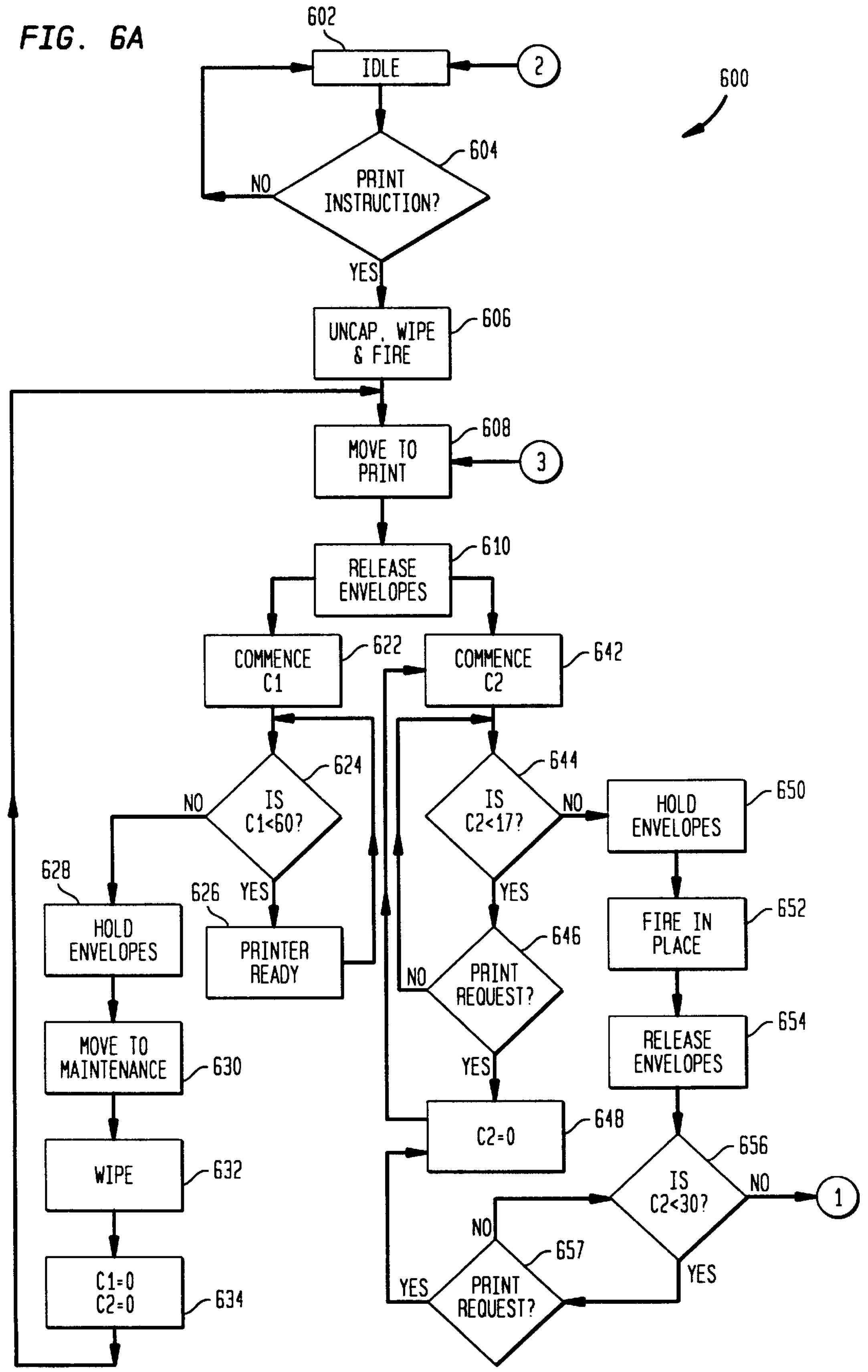
FIG. 6*a* is a flow chart showing a first portion of a maintenance routine in accordance with the present invention.

With the structure of the mailing machine 10 described as above, the operational characteristics will now be described with reference to FIGS. 6*a* and 6*b* while recalling the detailed structures described above. Referring to FIG. 6*a* in view of FIGS. 1 and 4, a maintenance routine 600 run by the printer controller 320 is shown. At 602, the mailing machine 10 is idle such as after just being turned on and before any envelopes have been process. In this state, the carriage 120 remains in the maintenance position with the caps 134*a* and 134*b* covering the arrays of nozzles 112*a* and 112*b*, respectively. Next at 604, the printer controller 320 determines whether or not a move to print position instruction has been received from the microprocessor 360. This instruction is issued in response to the operator placing a stack of envelopes in the singulator module 400 or requesting a tape from the user interface 380. If no, then the mailing machine remains at idle. If yes, then at 606 the printer controller 320 directs the maintenance assembly 130 to uncap the arrays of nozzles 112*a* and 112*b* and wipe the arrays of nozzles 112*a* and 112*b* and fires the arrays of nozzles 112*a* and 112*b* into their respective recessed caps 134*a* and 134*b*. In the preferred embodiment, each nozzle is fired one hundred (100) times. In this manner, any stale ink or clogging will be eliminated. Next at 608, the printer controller 320 causes the carriage 120 to move to the proper print position. This may be either the tape print position or the envelope print position, as necessary. However, for the sake of simplicity the remaining discussion will focus on the envelope print position with the understanding that those skilled in the art will recognized that the description below is equally well suited to the tape print position and even intermixed requests to print envelopes and tape.

Once the carriage 120 moves to the envelope print position, at 610 the printer controller 320 instructs the microprocessor 360 to allow or release envelopes into the print zone underneath the carriage 120. Next, the routine 600 branches off into two separate processes, one beginning at 622 and the other beginning at 642, that are run in parallel. In the first branch, at 622 the printer controller begins a count C1 that is a measures of an amount of elapsed time since moving to the print position. Next at 624, a determination is made whether or not the count C1 is less than sixty (60) seconds. If yes, then at 626 the printer controller 320 is ready to issue appropriate signals to the cartridges 110*a* and 110*b*, respectively, so as to print the next postal indicia before control returns to 624. If no, then at 628 the printer controller 320 instructs the microprocessor 360 to hold envelopes and not allow them into the print zone. Next, at 630 the printer controller 320 directs the carriage 120 to move to the maintenance position. Next, at 632 the printer controller 320 causes the wiper blades 132*a* and 132*b* to wipe the arrays of nozzles 112*a* and 112*b*, respectively. Thus, a forced wiping of the arrays of nozzles 112*a* and 112*b* occurs while the envelopes are delayed before printing is allowed to resume. Next, at 634 the counter C1 and the counter C2 are reset to zero before control returns to 608.

Thus, it should now be apparent that the first branch allows continuous printing of envelopes until a predetermined amount of time has elapsed. Then, a forced wiping of the arrays of nozzles 112*a* and 112*b* occurs while the envelopes are delayed before printing is allowed to resume.

In the second branch, at 642 the printer controller begins a count C2 that is a measures of an amount of elapsed time since moving to the print position or since completing printing of the most recent postal indicia as will be described below. Next at 644, a determination is made whether or not the count C2 is less than seventeen (17) seconds. If yes, then at 646 a determination is made as to whether or not the printer controller 320 has received a print request from the microprocessor 360. If yes, then at 648 the printer controller 320 issues the appropriate signals to the cartridges 110*a* and 110*b*, respectively, so as to print the next postal indicia and the counter C2 is reset to zero once the postal indicia has finished printing before control returns to 642. However, if at 646 the answer is no, then control returns to 644. On the other hand, if at 644 the answer is no, then at 650 the printer controller 320 instructs the microprocessor 360 to hold envelopes and not allow them into the print zone. Next, at 652 the printer controller 320 fires the arrays of nozzles 112*a* and 112*b*. Since the carriage 120 is in the print position without an envelope 20 being present, the ink lands on the foam pads 266*a* and 266*b* and is absorbed. Next, at 654 the printer controller 320 instructs the microprocessor 360 to allow or release envelopes into the print zone. Next, at 656 a determination is made whether or not the count C2 is less than thirty (30) seconds. If yes, then at 657 a determination is made as to whether or not the printer controller 320 has received a print request from the microprocessor 360. If yes, then control returns to 648. However, if the answer at 657 is no, then control returns to 656.

Figure 6B:
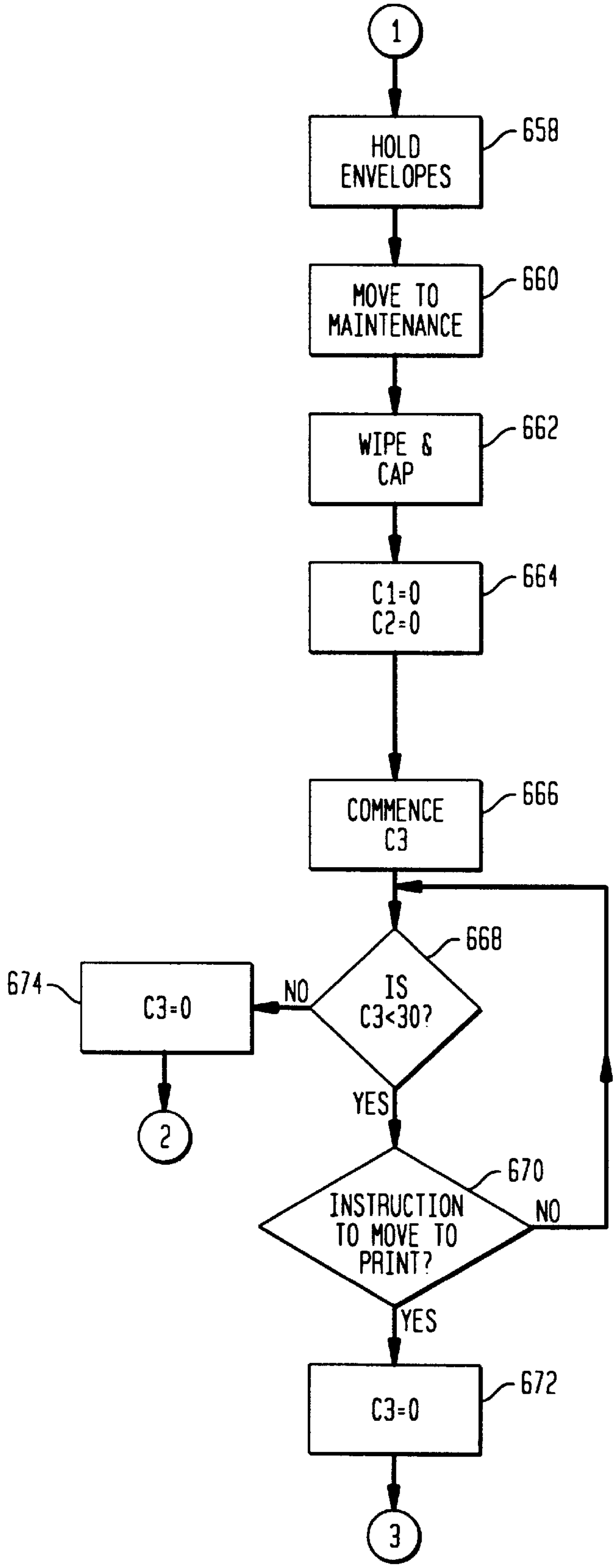
FIG. 6*b* is a flow chart showing a second portion of the maintenance routine in accordance with the present invention.

On the other hand, if at 656 the answer is no, then at 658 in FIG. 6*b*, the printer controller 320 instructs the microprocessor 360 to hold envelopes and not allow them into the print zone. Next, at 660 the printer controller 320 directs the carriage 120 to move to the maintenance position. Next, at 662 the printer controller 320 causes the wiper blades 132*a* and 132*b* to wipe the arrays of nozzles 112*a* and 112*b*, respectively, and the caps 134*a* and 134*b* to cap the arrays of nozzles 112*a* and 112*b*, respectively. Next, at 664 the counter C1 and the counter C2 are reset to zero. Next, at 666 the printer controller 320 begins a count C3 that is a measures of an amount of elapsed time since the capping. Next, at 668 a determination is made whether or not the count C3 is less than thirty (30) seconds. If yes, then at 670 a determination is made as to whether or not the printer controller 320 has received an instruction from the microprocessor 360 to move the carriage 120 to the print position. If yes, then at 672 the count C3 is reset to zero before control returns to 608. However, if at 670 the answer is no, then control returns to 668. On the other hand, if the answer at 668 is no, then at 674 the count C3 is reset to zero before control returns to 602.

Thus, it should now be apparent that the second branch allows for uninterrupted continuous printing of envelopes so long as the time delay between successive envelopes is less than seventeen (17) seconds. Once the time delay reaches this threshold level, the printer controller 320 fires the arrays of nozzles 112*a* and 112*b* in place. Then, if the delay continues for another thirteen (13) seconds, then the printer controller 320 wipes and caps the arrays of nozzles 112*a* and 112*b*.

Those skilled in the art will recognize that according to the second branch, the arrays of nozzles 112*a* and 112*b* are only allowed to fire in place one (1) time. Following that maintenance operation, if an envelope 20 is not scheduled to arrive within an additional thirteen (13) seconds (30–17), then the arrays of nozzles 112*a* and 112*b* are wiped and capped.

It should now be apparent to those skilled in the art that the present invention provides numerous advantages by balancing the needs of mailing machine throughput and print quality. One advantage is the capability to fire the arrays of nozzles 112*a* and 112*b* while in the envelope print position after long delays between successive envelopes. This helps maintain the arrays of nozzles 112*a* and 112*b* is proper working order without having to take the time to return to the maintenance module 130. As an illustration, assuming a firing rate of five hundred (500) microseconds per column of print, it takes approximately seven and a half (7.5) milliseconds to fire each nozzle in the arrays of nozzles 112*a* and 112*b* fifteen (15) times. On the other hand, to move the carriage 120 from the envelope print position to the maintenance position, fire all nozzles and then move the carriage 120 back to the envelope print position requires approximately 4 seconds. Thus, the time difference is 3.925 seconds during which about sixteen (16) extra envelopes could be printed utilizing the present invention assuming a peak printing rate of four (4) envelopes per second. As a result, the through put of the mailing machine is increased. Of course those skilled in the art will appreciate that actual results will depend upon a variety of implementation details.

Another advantage of this capability is that it provides the operator with a period of time to recognize that the singulator module 400 has emptied and replenish it with another stack of envelopes requiring processing.

Still another advantage is the capability to recognize when the arrays of nozzles 112*a* and 112*b* have been capped in relation to when the next print instruction is received. In this way, if the capping has occurred within a threshold level of a subsequent print request, then the carriage 120 can be moved to the print position without the need for wiping and firing into the recessed caps 134*a* and 134*b*. In this manner, time is saved in bringing the carriage 120 out to the print position and throughput is again increased.

In the preferred embodiment, when the microprocessor 360 is instructed by the printer controller 320 to hold envelopes (at 628 and 650), the microprocessor 360 does not actually stop feeding the envelopes 20. Instead, the microprocessor 360 performs a controlled slow down of the envelopes 20 and then a corresponding speed up of the envelopes 20 by issuing suitable motor profiles to the motor controller 310. To compute these motor profiles, the microprocessor uses the current position (derived from data supplied by the sensor module 500 and the encoder system 270) of the next envelope to be printed and an estimate of the amount time required to perform the maintenance operation selected (wipe, fire in place and wipe/cap) the printer module 100 will be ready to print supplied by the printer controller 320. In this way, noise is reduced by minimizing the accelerations and decelerations of the conveyor apparatus 200. Also, throughput is increased by having the envelope 20 back up to printing speed and just entering the print zone at the time that the printer module 100 is anticipated to be ready to print. In the preferred embodiment, this is within approximately five (5) milliseconds of the completion of the fire in place maintenance operation.

Based on the above description and the associated drawings, it should now be apparent that the present invention substantially overcomes the problems associated with registering the top surface of an envelope at a predetermined distance from a print head. Importantly, by using a channel on the bottom surface of the registration shield, the negative consequences of paper dust accumulating on the arrays of nozzles is reduced.

Many features of the preferred embodiment represent design choices selected to best exploit the inventive concept as implemented in a mailing machine utilizing individual bubble jet ink cartridges. However, those skilled in the art will recognize that the concepts of the present invention are applicable to a single print head design where the arrays of nozzles are integrated into a single cartridge.

Moreover, those skilled in the art will recognize that various modifications can be made without departing from the spirit of the present invention. For example, the exact thresholds for the counters provided have been derived from empirical data and are not intended to limit the scope of the invention. As another example, firing the arrays of nozzles in place could be accomplished between envelopes without instructing the microprocessor to hold the envelopes provided there was adequate spacing between the envelopes and the motors and encoder system were designed to a suitable resolution.

Therefore, the inventive concepts in their broader aspects are not limited to the specific details of the preferred embodiments but are defined by the appended claims and their equivalents.

What is claimed is:

1. A mailing machine comprising:

a printer module including:

an array of ink jet print elements for printing on an envelope; and repositioning means in operative engagement with the array of ink jet print elements for moving the array of ink jet print elements between a maintenance position and a print position; and transport means for feeding the envelope in a path of travel so that the envelope passes in opposed relationship to the array of ink jet print elements when the array of ink jet print elements are in the print position; and a controller in operative communication with the transport means and the printer module, the controller for:

keeping an indicator of an amount of time elapsed between printing successive envelopes; and if the indicator reaches a predetermined threshold, causing the array of ink jet print elements to perform a fire in place maintenance operation by firing the array of ink jet print elements in the absence of the envelope while the printer module is in the print position.

2. The mailing machine of claim 1, wherein:

an area opposed to the array of ink jet print elements in the path of travel defines a print zone; and the controller prevents the envelope from entering the print zone during the fire in place maintenance operation by sending suitable drive signals to the transport means.

3. The mailing machine of claim 2, wherein: the controller adjusts the speed of the envelope so that the envelope is feed into the print zone within approximately 0.005 seconds of the completion of the fire in place maintenance operation.

4. The mailing machine of claim 3, wherein:

the envelope has a bottom surface and a top surface that faces the array of ink jet print elements; and the transport means includes a registration ski located in opposed relation to the array of ink jet print elements so that the registration ski contacts the bottom surface of the envelope as the envelope is fed through the print zone, the registration ski includes an opening directly opposed to the array of ink jet print elements so that the fire in place maintenance operation does not introduce ink into the path of travel.

5. The mailing machine of claim 1, wherein:

the envelope has a bottom surface and a top surface that faces the array of ink jet print elements; and the transport means includes a registration ski located in opposed relation to the array of ink jet print elements so that the registration ski contacts the bottom surface of the envelope as the envelope is fed through the print zone, the registration ski includes an opening directly opposed to the array of ink jet print elements so that the fire in place maintenance operation does not introduce ink into the path of travel.

6. The mailing machine of claim 1, wherein:

the printer module further includes a maintenance system in operative communication with the controller and having a wiper blade for swabbing the array of ink jet print elements and a cap for sealing the array of ink jet print elements off from ambient air, the maintenance system being operative while the array of ink jet print elements is in the maintenance position; and the controller:

keeps a second indicator of an amount of time elapsed between a most recent print operation and capping of the array of ink jet print elements; and if the second indicator is less than a second predetermined threshold when the repositioning means is instructed to move the array of ink jet print elements from the maintenance position to the print position, causing the array of ink jet elements to move directly to the print position;

otherwise, if the second indicator is greater than a second predetermined threshold when the repositioning means is instructed to move the array of ink jet print elements from the maintenance position to the print position, causing the maintenance system to perform a second maintenance operation on the array of ink jet print elements before moving to the print position.

7. The mailing machine of claim 6, wherein:

an area opposed to the array of ink jet print elements in the path of travel defines a print zone; and the controller prevents the envelope from entering the print zone during the fire in place maintenance operation by sending suitable drive signals to the transport means.

8. The mailing machine of claim 7, wherein:

the controller adjusts the speed of the envelope so that the envelope is feed into the print zone within approximately 0.005 seconds of the completion of the fire in place maintenance operation.

9. The mailing machine of claim 8, wherein:

the envelope has a bottom surface and a top surface that faces the array of ink jet print elements; and the transport means includes a registration ski located in opposed relation to the array of ink jet print elements so that the registration ski contacts the bottom surface of the envelope as the envelope is fed through the print zone, the registration ski includes an opening directly opposed to the array of ink jet print elements so that the fire in place maintenance operation does not introduce ink into the path of travel.

10. A method of operating a mailing machine including a printer module having an array of ink jet print elements for printing on an envelope, the method comprising the step(s) of:

moving the array of ink jet print elements between a maintenance position and a print position;

feeding the envelope in a path of travel so that the envelope passes in opposed relationship to the array of ink jet print elements when the array of ink jet print elements are in the print position; and keeping an indicator of an amount of time elapsed between printing successive envelopes; and if the indicator reaches a predetermined threshold, causing the array of ink jet print elements to perform a fire in place maintenance operation by firing the array of ink jet print elements in the absence of the envelope while the array of ink jet print elements are in the print position.

11. The method of claim 10, wherein:

an area opposed to the array of ink jet print elements in the path of travel defines a print zone; and further comprising the step(s) of:

preventing the envelope from entering the print zone during the fire in place maintenance operation.

12. The method of claim 11, further comprising the step(s) of:

adjusting the speed of the envelope so that the envelope is feed into the print zone within approximately 0.005 seconds of the completion of the fire in place maintenance operation.

13. The method of claim 12, wherein:

the envelope has a bottom surface and a top surface that faces the array of ink jet print elements; and further comprising the step(s) of:

providing a registration ski located in opposed relation to the array of ink jet print elements when the array of ink jet elements are in the print position so that the registration ski contacts the bottom surface of the envelope as the envelope is fed through the print zone; and wherein:

the registration ski includes an opening directly opposed to the array of ink jet print elements so that the fire in place maintenance operation does not introduce ink into the path of travel.

14. The method of claim 10, wherein:

the envelope has a bottom surface and a top surface that faces the array of ink jet print elements; and further comprising the step(s) of:

providing a registration ski located in opposed relation to the array of ink jet print elements when the array of ink jet elements are in the print position so that the registration ski contacts the bottom surface of the envelope as the envelope is fed through the print zone; and wherein:

the registration ski includes an opening directly opposed to the array of ink jet print elements so that the fire in place maintenance operation does not introduce ink into the path of travel.

15. The method of claim 10, wherein:

the printer module further includes a maintenance system in operative communication with the controller and having a wiper blade for swabbing the array of ink jet print elements and a cap for sealing the array of ink jet print elements off from ambient air, the maintenance system being operative while the array of ink jet print elements is in the maintenance position; and further comprising the step(s) of:

keeping a second indicator of an amount of time elapsed between a most recent print operation and capping of the array of ink jet print elements; and if the second indicator is less than a second predetermined threshold when the repositioning means is instructed to move the array of ink jet print elements from the maintenance position to the print position, causing the array of ink jet elements to move directly to the print position;

otherwise, if the second indicator is greater than a second predetermined threshold when the repositioning means is instructed to move the array of ink jet print elements from the maintenance position to the print position, causing the maintenance system to perform a second maintenance operation on the array of ink jet print elements before moving to the print position.

16. The method of claim 15, wherein:

an area opposed to the array of ink jet print elements in the path of travel defines a print zone; and further comprising the step(s) of:

preventing the envelope from entering the print zone during the fire in place maintenance operation.

17. The method of claim 16, further comprising the step(s) of:

adjusting the speed of the envelope so that the envelope is feed into the print zone within approximately 0.005 seconds of the completion of the fire in place maintenance operation.

18. The method of claim 17, wherein:

the envelope has a bottom surface and a top surface that faces the array of ink jet print elements; and further comprising the step(s) of:

providing a registration ski located in opposed relation to the array of ink jet print elements when the array of ink jet elements are in the print position so that the registration ski contacts the bottom surface of the envelope as the envelope is fed through the print zone; and wherein:

the registration ski includes an opening directly opposed to the array of ink jet print elements so that the fire in place maintenance operation does not introduce ink into the path of travel.

* * * * *